United States Patent [19]
Khudenko

[11] Patent Number: 5,564,861
[45] Date of Patent: Oct. 15, 1996

[54] THERMAL METHOD OF IN-SITU SOIL TREATMENT

[76] Inventor: Boris M. Khudenko, 744 Moores Mill Rd., Atlanta, Ga. 30327

[21] Appl. No.: 468,245

[22] Filed: Jun. 6, 1995

[51] Int. Cl.$^6$ .................. B09B 5/00; E02D 3/11
[52] U.S. Cl. .................. 405/128; 405/258; 588/253
[58] Field of Search .................. 166/260, 261, 166/256, 262; 405/128, 129, 258; 588/253

[56] References Cited

U.S. PATENT DOCUMENTS

| | | | |
|---|---|---|---|
| 2,788,071 | 4/1957 | Pelzer | 166/261 |
| 2,863,510 | 12/1958 | Tadema et al. | 166/260 |
| 3,024,841 | 3/1962 | Willman | 166/261 |
| 3,127,935 | 4/1964 | Poettmann et al. | 166/260 |
| 3,205,947 | 9/1965 | Parker | 166/262 |
| 4,376,598 | 3/1983 | Brouns et al. | 405/258 |
| 5,276,253 | 1/1994 | Circeo, Jr. et al. | 588/253 |
| 5,316,411 | 5/1994 | Buelt et al. | 405/128 |

OTHER PUBLICATIONS

Grubb and Sitar Report EPA/600-R-94/120 "Evaluation of Technologies for In-situ Cleanup of DNAPL Contaminated Sites", Aug. 1994.

*Primary Examiner*—Stephen J. Novosad
*Attorney, Agent, or Firm*—Needle & Rosenberg

[57] ABSTRACT

A thermal method of in-situ soil treatment using a charge of combustible substrate placed within the area to be treated and combusted with the use of oxidizer resulting in solid products and generating no gases. The substrate can be a metal, such as aluminum or iron, and oxygen can be an oxidizer. Alternatively, thermite mixtures can be used. The treatment of soil constituents and pollutants can be achieved by vaporizing, pyrolyzing, incinerating, oxidizing, reducing, or vitrifying the constituents of pollutants and the soil in the zone of influence of the charge of the combustible substrate.

19 Claims, 4 Drawing Sheets

THERMAL METHOD OF IN-SITU SOIL TREATMENT

FIELD OF INVENTION

The present method belongs to high temperature insitu soil treatment for decontamination, increasing the load bearing capacity, and constructing retaining and cut off walls.

PRIOR ART

The pertinent method developed by Fitzpatrick et al. (U.S. Pat. No 4,376,598) is the soil electromelting also called vitrification. Grubb and Sitar of the University of California—Berkeley, in a report EPA/600/R-94/120 ("Evaluation of Technologies for In-situ Cleanup of DNAPL Contaminated Sites") to the U.S. EPA state that the electromelting is a unique process for treatment of mixed waste comprising DNAPL (organics), heavy metals, and radioactive materials.

Electromelting requires a power supply, an initiation conductivity strip, usually made of granular carbonaceous material and glass frit, electrodes and control system. The conductivity strip is applied to the soil surface, electrodes are placed in contact with the ends of the strip, and the power is provided to the electrodes. The electric current through the strip produces heating and causes the strip and the adjacent soil to melt. Gradually, larger and larger soil volume is involved in the melt and the electroconducting strip burns out. The melt has increased electric conductance as compared to soil and further electromelting occurs without the electroconducting strip. The molten mass is enveloped by a layer of heated soil where pyrolysis of organics occurs. A further layer has a temperature of water drying and organics vaporization. Upon completing melting of the desired volume of soil, the melt cools and becomes a rocklike or a glass-like material.

Disadvantages of electromelting are the very high energy demand and low energy efficiency, the complex and heavy equipment required, and, consequently, the very high costs. The method cannot be used at temperatures less than the soil's melting point to insure adequate electroconductance. Additionally, the electromelting can be done only from the top down. It cannot be applied to a desired contaminated zone at a specified depth below the surface without melting the soil above. The maximum treatment depth is limited to 7.5 m. Also, this technique is applicable only in the vadose zone. Moreover, the process is difficult to conduct in highly porous media, in presence of metallic and other very conductive objects, and rubble.

SUMMARY OF THE INVENTION

The objectives of the present invention include but are not limited to the following: (1) to provide a thermal method of soil treatment that does not generate fuel combustion gases and eliminates or significantly reduces formation of other gases, (2) to provide a method allowing soil treatment at any location of the contaminated zone, or at any desired depth, and (3) to provide a simple, efficient, and inexpensive method of soil treatment.

These objectives are achieved by placing a combustible substrate within the contaminated zone to be treated (the treatment zone), supplying an oxidizer to the substrate, igniting and combusting the substrate without formation of gaseous products, and using the heat of combustion for the required treatment of the desired contaminated soil volume.

For example, metal substrates can be combusted with either oxygen or metal oxides, or combination of both oxygen and metal oxides as oxidizers. When using oxygen as oxidizer, aluminum or iron are preferable combustible substrates. With metal oxides as oxidizers, thermite mixtures can be used. The most common thermite mixture is made of aluminum powder and iron oxides ($Fe_2O_3$), although numerous other thermite mixtures are known and can be used. Both processes result in high combustion temperatures and large heat generation due to high heat values of substrate metals. In oxygen combustion of aluminum or iron, metal oxides are formed. The oxygen supply rate can be used to control the metal combustion rate. In thermite reactions with aluminum powder and iron oxides, aluminum oxide and metallic iron are formed. Combustion gases are not formed when these substrates combust with these oxidizers. Accordingly, no heat is lost with the gases and a high heat efficiency is achieved.

The combustible substrate charges can be placed in the contaminated area to be treated by using vertical, inclined, or horizontal boreholes, excavations, hydraulic punch holes, or other means. The charges can be positioned at any depth in a borehole, well or excavation under structures, roads, and waterways. Single or multiple combustible charges in each well or in multiple wells can be used.

Multiple boreholes can be arranged in line and form a wall, walls can have closed, straight, or curvilinear patterns, or grid-like patterns. Multiple boreholes may also form blocks or contiguous areas covered by adjacent wells with conjugate or partly overlapping zones of influence of the multiple boreholes. The charges can be covered and confined in pressurized volumes to hold a pressure and to facilitate outward dissipation and filtration of gases, vapors and liquids near the charges.

The volume of soil enveloped by an imaginary boundary within which the desired operational conditions (for example, temperature) are established upon combustion of the substrate charge is called herein the zone of influence. The radius of this zone is the radius of influence. Besides temperature, other conditions, may also be operable in determining the zone of influence. Such conditions will be discussed later. The radius of influence has a dynamic nature. Due to the outward heat transfer from the center of the zone, the radius where a desired temperature (or other conditions) is established changes in time. Accordingly, a conditional radius of influence, for example, established as a preset time after combustion, can be used. This time can be determined based on technical considerations (e.g., nature of soil and pollutants) and economic considerations.

Depending on temperature regimes within the zone of influence the heat treatment can be conducted as follows: (1) vaporization of the media to be extracted from the soil (100° C. for water or other specific temperatures for various organics), (2) contaminant pyrolysis (250° C. to 400° C., depending on the organics), (3) high temperature combustion of pollutants (600° C. to 1000° C.), (4) soil-contaminant vitrification (usually, greater than 1000° C.). In the vaporization mode, the vaporized matter is evacuated, collected, and may be treated, for example, at a wellhead. Separate collection wells for vaporization gases can be provided. The carbonaceous residue of the pyrolyzed matter will stay in the treated soil as harmless materials, while carbon dioxide, water vapor, hydrogen and other gaseous products will be either confined in the soil, or discharged and treated, if needed, at the surface. The high temperature combustion occurs in the presence of an oxidizer provided for the incineration of pollutants. This oxidizer is delivered to the soil in the treatment zone and can be the same or different from the oxidizer used to combust the charge. Incineration products are mainly carbon dioxide and water vapor. Sufficiently complete destruction of organics occurs in the high temperature combustion and the gaseous products can be discharged to the atmosphere. In case of vitrification, the destruction of organics may occur as a complete oxidation with an ample oxidizer supply, or as a reduction and/or pyrolysis with deficient oxidant supply. Mineral constituents of soil and the contaminants, including the radioactive nuclides, will be vitrified into a consolidated rocklike or glass-like material. Accordingly, the remaining contaminants are immobilized in the vitrified material. This material is virtually unleacheable, and the soil is impermeable to water. It also has an increased bearing capacity as compared to the loose soil.

The borehole space above the combustible substrate may be plugged. In case of moist or wet soil and a sufficient supply of oxidizer, wet oxidation conditions, or, at appropriate temperature and pressure, supercritical oxidation conditions can be created in the treatment zone. All solid, liquid, and gaseous products of these reactions are expected to be harmless and may be retained in the soil or allowed to gradually diffuse within the soil and to the atmosphere. In dry soils, water or steam may be injected to the combustion zone to facilitate the supercritical oxidation. To address the formation of chlorides or hydrogen chloride, alkalies can be added, for example, as a water solution to the treatment zone. Wet or supercritical oxidations may be complemented with the addition of reagents, for example, hydrogen peroxide. Reducing conditions helpful for dehalogenation of organics may be enhanced by addition of a reducing substance, for example, methane, propane, or hydrogen, or other gaseous, solid or liquid fuel to the treatment zone. The destruction of organics can be further improved by cycling the oxidizing and reducing conditions in the combustion and treatment zones. Such cycling can be achieved by intermittent increase and decrease in supply of oxidizer and corresponding decrease and increase in supply of reducing substances.

In cases of treating water saturated soil layers, water can be initially displaced near the combustible substrate with compressed oxygen, air, nitrogen, water vapor, or other gases. After that, the water will be pushed outward from the combustion front by the vapors generated from the heating of the moisture at this zone. Water present in the soil or added to the treatment zone can form steam that can be used to vaporize organic pollutants and carry them to the surface for treatment or utilization.

The process can be dynamically controlled by sensing pressure and temperature in the combustion zone or at the combustible substrate. The temperature and pressure data can be used to interrupt, reduce, increase, or restart the supply of oxygen and/or other gases.

DETAILED DESCRIPTION OF EMBODIMENTS

Figure 1:
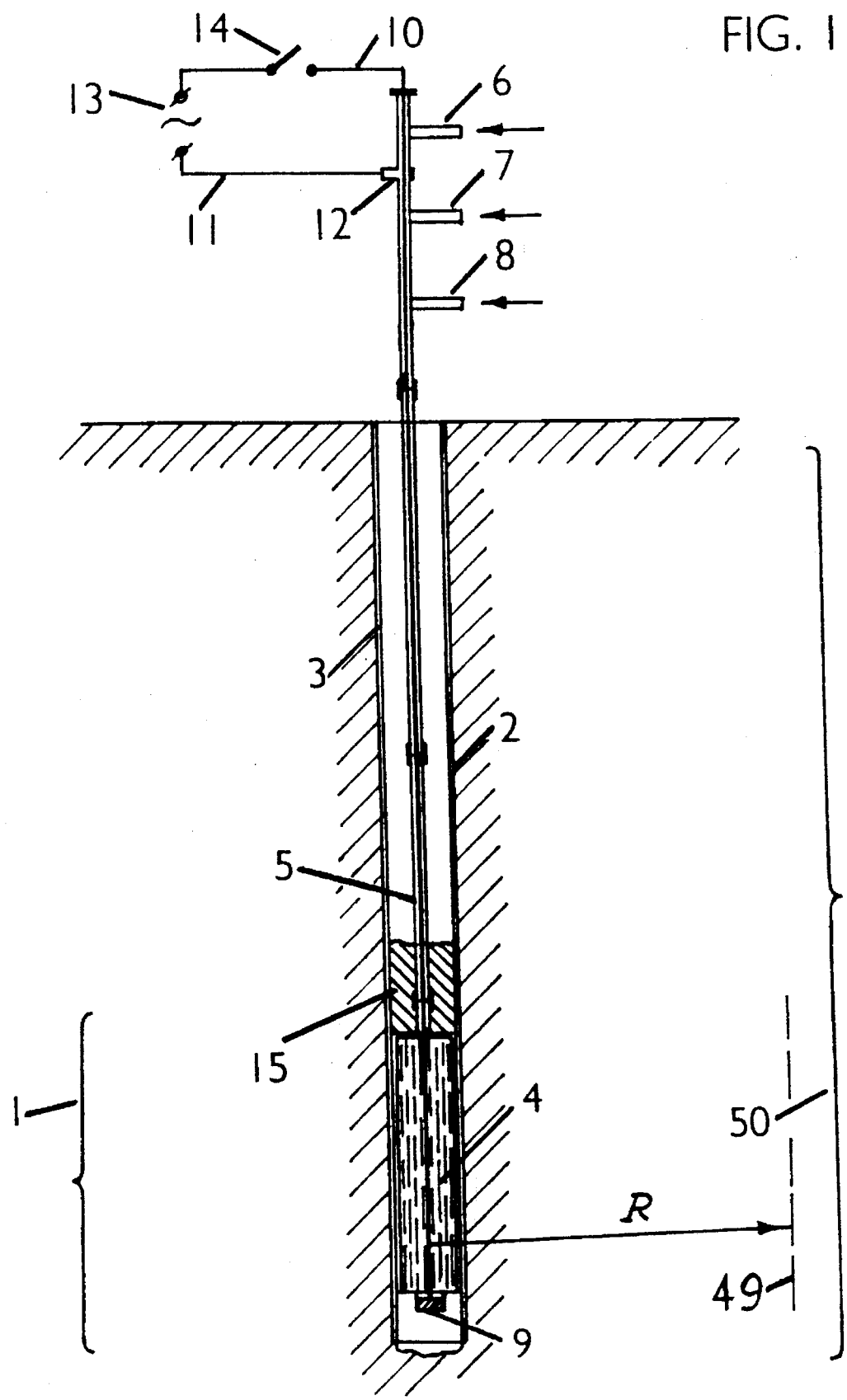
FIG. 1 is a verticle crossection of a borehole in a system for thermal treatment of soil.

FIG. 1 illustrates a system for treatment of contaminated soil comprising a contaminated soil zone 1, a borehole 2 in the soil layer 50, an optional well casing 3, a block of a combustible substrate 4, a pipe 5 attached to the block 4 for oxidizer supply, fittings 6, 7, and 8 attached to pipe 5 for connecting the source of oxidizer, for example, oxygen, and optional supply of combustible gases, nitrogen, water, or steam, an ignition means 9, for example, an electrical igniter, wires 10 and 11, clamp 12, ignition power source 13, and a switch 14 constituting with the pipe 5 and ignition means 9 the ignition circuit, an optional plugging material 15, such as soil, sand, concrete, or other material placed above the combustible substrate 4. A single block, or charge, of the combustible substrate or several stacked blocks can be used.

Figure 2:
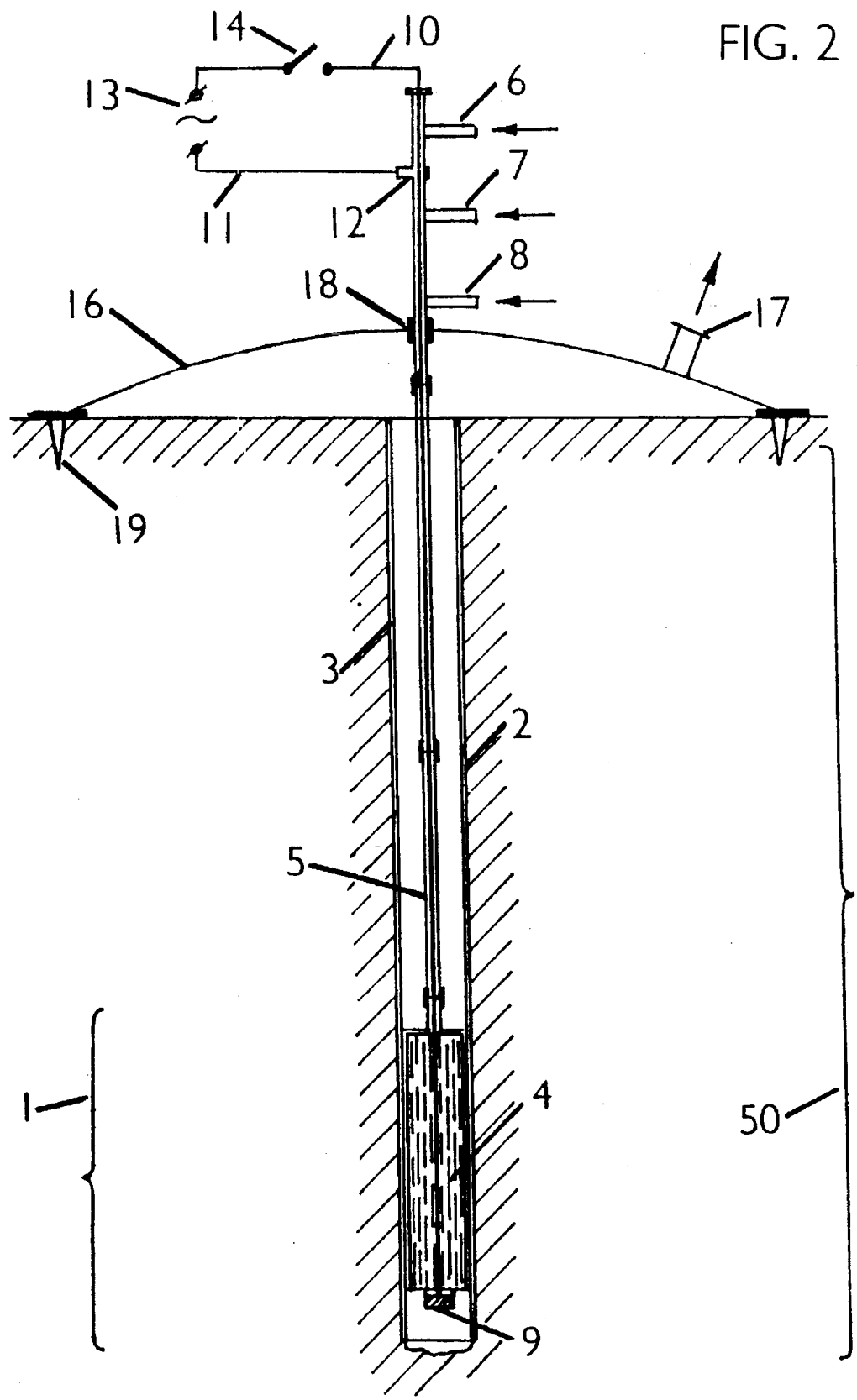
FIG. 2 is a crossection of an alternative configuration of a borehole in a system for thermal treatment of soil.

FIG. 2 illustrates a modification of the borehole system given in FIG. 1, in which many elements are the same and their description is not repeated. In the system of FIG. 2, the plug 15 is not used, and means 16, for example, a metal dome, is provided for the exhaust gas collection. Means 16 is tightly attached to the pipe 5 using a fitting 18, and secured to the ground surface using a barrier 19 anchored into the ground. A fitting 17 is provided in the gas collection dome 16 for evacuating the collected gas to a gas treatment unit.

Figure 3:
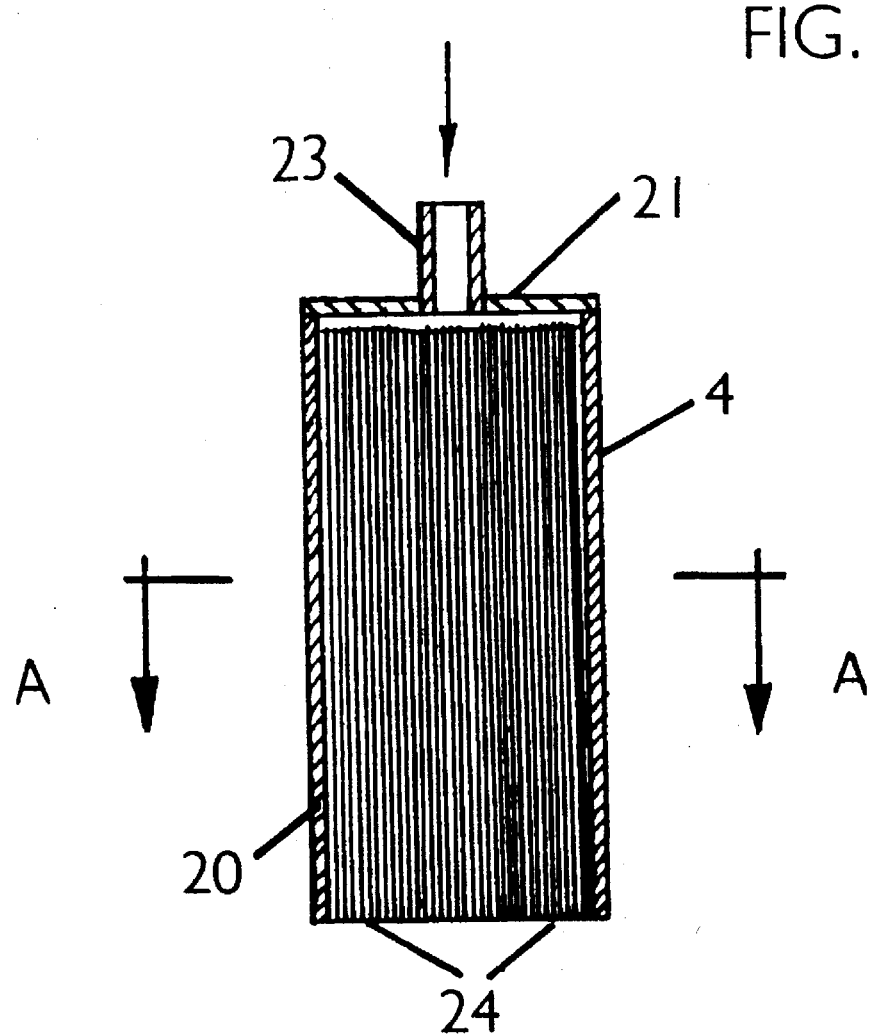
FIG. 3 is a crossection of a block of a combustible substrate.
Figure 4:
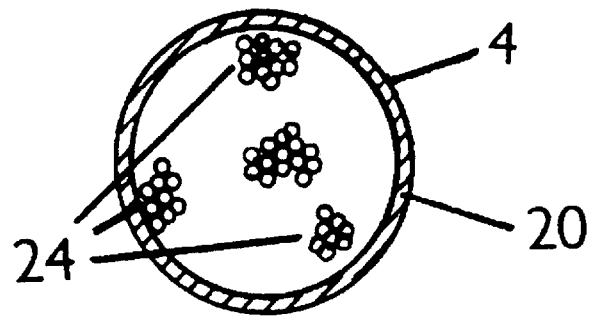
FIG. 4 is a view along lines A—A in FIG. 3.

FIGS. 3 and 4 present one possible design of the combustible block 4. It comprises a cylindrical body 20, a top plate 21 tightly secured to the body 20, and a fitting 23 attached to the top plate 20 and intended for connecting pipe 5 for oxidizer (and other gases) supply. The internal space in the body 20 is densely packed with generally linear strands of wire made of combustible substrates. The generally longitudinal holes spaces between the wires provide passages for the gases fed into the block. Ignition means 9 shown in FIGS. 1 and 2 is secured under the block 4. Combustible blocks can be arranged serially within the borehole and combusted sequentially using one or more igniters.

Combustible blocks holding thermite charges can be constructed of a variety of materials and in a variety of shapes. The charge can also be divided into sections that will be combusted sequentially. Sections can be separated from each other by layers of a mineral insulation material to delay the ignition of each consecutive section. Optionally, oxygen supply, and supply of other gases, neutral or reducing, to the thermite charges can be provided.

Metal charges combusted with oxygen and thermite mixtures can be combined.

Referring now to FIGS. 1, 3, and 4 the system is operated as follows. Borehole 2 is made (optionally fitted with casing 3), blocks 4 with ignition means 9, wires 10 and 11, clamp 12, and switch 14 are installed, plugging material 15 is optionally put in the top of the borehole 2, sources of oxidizer, and optionally, combustible gas, water or steam, or nitrogen are connected via lines 6, 7 and 8 to the pipe 5, the ignition power source is connected to wires 10 and 11. Switch 14 is turned to ignite the ignition means, the oxidizer is supplied and blocks 4 are ignited. The oxidizer flows through the line 6, pipe 5, and through the longitudinal spaces inside the block 4 to the bottom of the block 4 resulting in combustion from the bottom up.

While combusting the blocks 4, solid metal oxides are formed and heat is liberated. This heat is spent for at least a partial melting and for heating soil next to the borehole. The border of the zone of influence is marked by numeral 49. Simultaneously with the melting and heating within the zone of influence, moisture and volatile constituents in the soil will be vaporized and several chemical transformations as previously described may occur.

The described system can be used in dry and in water saturated soil. In the latter case, at least part of the borehole should be plugged with a material allowing a pressurization of a volume under the block of combustible substrate. Oxygen, air, or nitrogen, under pressure is pumped into block 4 for displacing water in the zone next to the ignition means and the combustible charge. Upon igniting the combustible block, water will be further displaced by the steam formed in the space around the combustion zone.

Under operating conditions, some gases may be formed in the thermal transformations of inorganic and organic constituents of the soil. These include, mainly, steam from water vaporization, and carbon dioxide and water vapor from organic and inorganic transformations. These gases do not need interception, collection or treatment.

If a thermite mixture is the substrate, the block 4 can be a canister with a thermite mixture. In such a case, oxygen supply is optional. The thermite is ignited by the ignition means 9, heat is liberated and soil treatment is effected. All other features are the same as in the case of the metal substrate-oxygen system and are not repeated.

Referring now to FIGS. 2, 3, and 4, the system is operated as follows. In cases when the volatile organic or inorganic constituents are formed in the thermal reactions in the soil, for example, hydrochloric acid, they may flow between the walls of the borehole 2, or the casing 3, from the borehole and into the collection dome 16, and further through the fitting 17 to a gas treatment unit. A special gas collection well placed in an appropriate location can also be provided. Optionally, steam can be formed at the combustion zone using either underground or added water as described above. The steam can vaporize organic pollutants and carry them to the wellhead for treatment or utilization.

Alternatively, there are possibilities of intercepting volatile constituents in the borehole, for example, by neutralizing hydrochloric acid using lime or other alkaline material placed above the combustion block 4 in the borehole.

Figure 5:
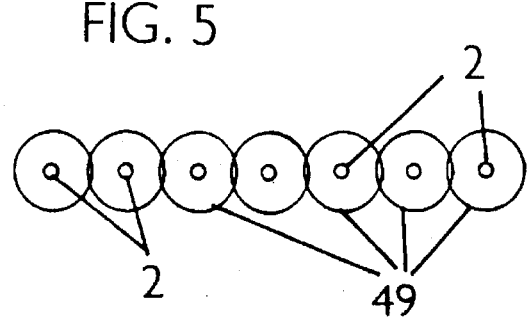
FIG. 5 is a plan view of the wall arrangement of boreholes.
Figure 6:
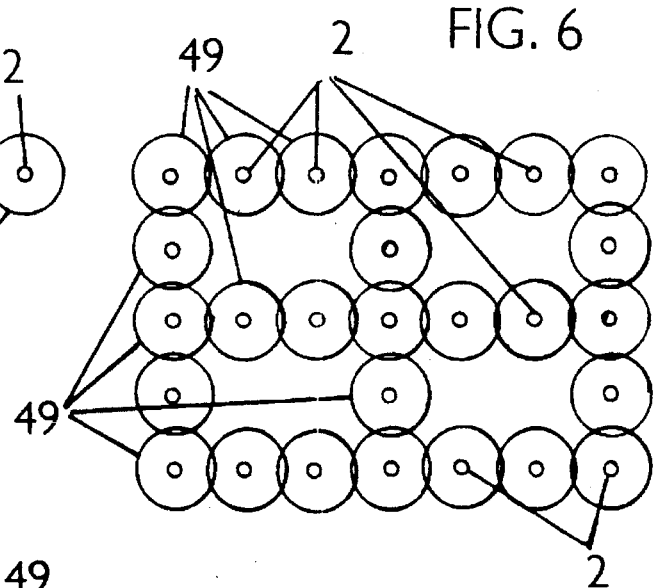
FIG. 6 is a plan view of the grid arrangement of boreholes.
Figure 7:
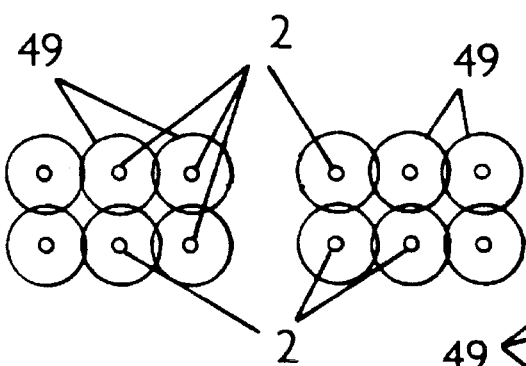
FIG. 7 is a plan view of the block arrangement of boreholes.
Figure 8:
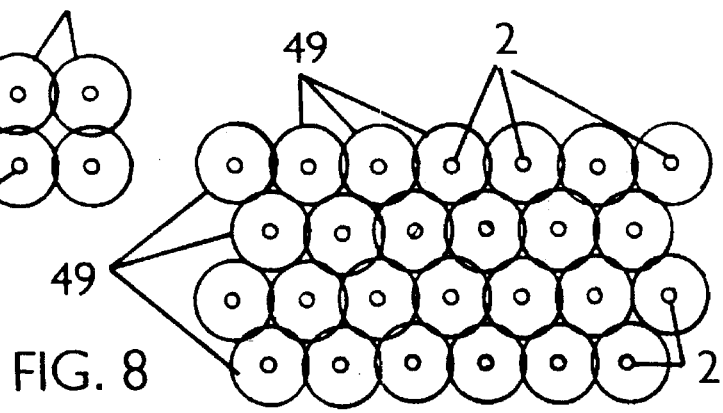
FIG. 8 is a plan view of the area arrangement of boreholes.

Referring now to FIGS. 5 through 8, there are shown several possible layouts of boreholes that may be used to fulfill the particular needs of the site. FIG. 5 is a wall configuration. This configuration may be used as a cut off wall for stopping a flow of groundwater. FIG. 7 is a block configuration, which possibly can be used to improve the bearing capacity of the soil. In such a case, substantial melting and solidification are required. FIG. 6 is a grid configuration that can be used for confining the soil pollutant from spreading with the groundwater flow. FIG. 8 is an area type layout that should be used in case of a complete cleanup of the polluted site. Optionally, tridimensional positioning of charges can be used. For example, charges can be placed at lower and upper boundaries of the area to be treated. More than one charge may be placed in a single borehole at different distances from the borehole's mouth. The order of firing in cases of wall, block, grid, and area configurations should be established to reduce heat dissipation and losses. The mass of combustible substrate and oxygen, or the thermite mixtures required, will be least in case of simultaneous firing of all boreholes. However, this may be not always practicable. Then, a section by section firing should be performed saving the heat of the previous firings in the zones of the sequential firings.

Thermal treatment of water saturated soil can be advantageously combined with the pumping and treating the groundwater. For example, the contaminated area is circled by an impermeable wall or a grid of walls made by the described method thus providing an encirclement. Groundwater is pumped from the inner area of the wall, or from multiple areas. This water is treated and discharged beyond the contaminated site. Dried, or largely dried, the area is now treated using the area layout of the boreholes (FIG. 8) thus rendering the soil clean.

A computational analysis of the present system showed that the system is technically and economically feasible and advantageous over the prior art. The basic embodiments described herein are examples of possible systems using in-situ combustion of substrate producing no fuel combustion gases during soil treatment. Other embodiments describe cases with very small generation of gases to be released from boreholes. Various other modifications are also possible. It will therefore be understood by those skilled in the art that the particular embodiments of the invention here presented are by way of illustration only, and are meant to be in no way restrictive; therefore, numerous changes and modifications may be made, and the full use of equivalents resorted to, without departing from the spirit or scope of the invention as outlined in the appended claims.

What is claimed is:

1. A thermal method of soil pollution treatment by changing, immobilizing, or evacuating mineral, organic and mixed constituents of and pollutants in a treatment zone in the soil, comprising steps of:

1) placing a combustible charge in a treatment zone in the soil and providing an oxidizer to the combustible substrate;

2) igniting and combusting the placed combustible charge with the oxidizer, without forming gases from combusting the placed combustible charge; and 3) releasing the heat from combusting the placed combustible charge, and effecting the thermal treatment by changing, immobilizing, or evacuating said pollutants.

2. The method of claim 1, wherein the combustible charge comprises a thermite mixture.

3. The method of claim 1, wherein the combustible charge comprises a metal.

4. The method of claim 3, wherein the metal is selected from the group consisting of iron, aluminum, magnesium, zinc, nickel and cobalt.

5. The method of claim 1, wherein the oxidizer is oxygen.

6. The method of claim 1, wherein the thermal treatment is selected from the group consisting of vaporization, pyrolysis, high temperature combustion, and vitrification.

7. The method of claim 1, further comprising selecting a thermal treatment reaction from the group consisting of oxidation, reduction, and substitution.

8. The method of claim 7, wherein the oxidation reaction is selected by providing an oxidizer to the soil in the treatment zone.

9. The method of claim 7, wherein the reduction reaction is selected by providing a reducing agent to the soil in the treatment zone.

10. The method of claim 1, further comprising providing water in liquid or vapor form to the treatment zone.

11. The method of claim 1, further comprising providing an alkali to the treatment zone.

12. The method of claim 1, further comprising multiple combustible charges placed at differing depths in the soil in a tridimensional configuration.

13. The method of claim 12, wherein the tridimensional configuration is selected from the group consisting of a wall, a block, an encirclement, a grid, and a continuous area.

14. The method of claim 1, wherein multiple combustible charges are used and are placed in a borehole at different positions in the borehole.

15. The method of claim 1, wherein the treatment is carried out in water saturated soil, and further comprising the step of providing a pressurized gas to a volume of soil surrounding the combustible charge to displace the water from the soil surrounding the combustible charge.

16. The method of claim 5, further comprising controlling the rate of the combusting step by controlling the rate of oxygen supply.

17. The method of claim 10, applied to soil contaminated with organics, wherein liquid water is provided, and further comprising steps of:

1) converting the liquid water to steam;

2) vaporizing organics by the steam, whereby an organic-laden steam is formed; and 3) conveying the organic-laden steam to the surface.

18. The method of claim 12, wherein the thermal treatment is carried out in water saturated soil and further comprising steps of:

1) placing multiple combustible charges in an encirclement configuration;

2) thermally treating the soil in the encirclement configuration, whereby an impermeable barrier is made; and 3) evacuating water from the said encirclement.

19. The method of claim 18, further comprising further thermally treating the soil in a treatment zone within the encirclement.

* * * * *